Aug. 25, 1959 D. I. COGGINS 2,900,701

SEMICONDUCTOR DEVICES AND METHODS

Filed April 7, 1953

INVENTOR
DONALD I. COGGINS
BY Paul S. Martin
ATTORNEY

United States Patent Office 2,900,701

Patented Aug. 25, 1959

2,900,701

SEMICONDUCTOR DEVICES AND METHODS

Donald I. Coggins, Stoneham, Mass., assignor, by mesne assignments, to Sylvania Electric Products Inc., Wilmington, Del., a corporation of Delaware Application April 7, 1953, Serial No. 347,320

4 Claims. (Cl. 29—25.3)

Figures 1, 2:
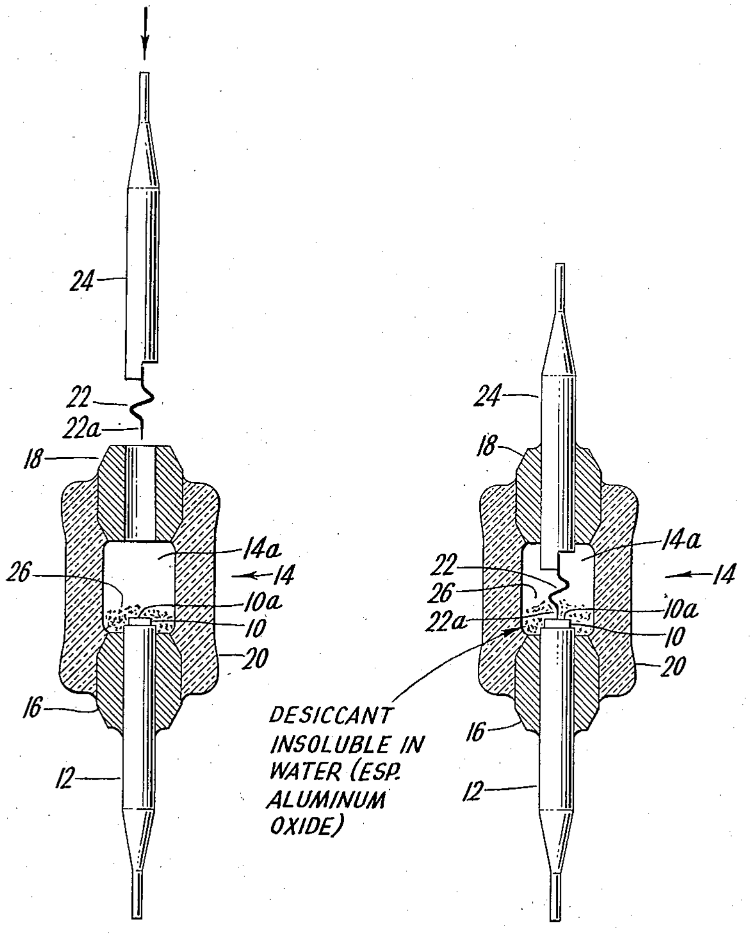

The present relates to semiconductor translators and transducers, such as diodes for rectification and other devices having rectifying contacts, and to their processing.

In a typical crystal diode as one form of rectifying contact semiconductor translator, a contoured resilient whisker element engages a chip or wafer of semiconductor material having a properly prepared contact surface. The assembly or unit is mounted within an enclosure which is preferably formed to be air-tight to afford protection against atmospheric attack of the prepared semiconductor surface, especially in the region of the contact. Despite intense investigation over a long period, and a variety of precautionary measures, there is still an objectionable amount of electrical loss or "shrinkage," production of unstable units, and failure during shelf life. It is difficult to reliably pin-point the reason for less than anticipated yields in actual production. This has been attributed to the many variables encountered during processing, for example, the quality of the semiconductor body, the nature of the rectifying contact, and the presence of contaminating substances such as are used in soldering, etching and/or pulsing. It is thought that the losses may be due, in part, to moisture in the limited volume of atmosphere trapped within the envelope of the unit, as well as surface moisture adhering to the prepared semiconductor surface and the envelope walls. This theory is at once verified, and the losses greatly reduced, by the present invention.

In accordance with one aspect of the present invention, a mass of a dehydrated, desiccant is placed within a sealed semiconductor envelope. When dehydrated, as well as when partially hydrated in this use, the preferred desiccant remains electrically insulating and chemically inert insofar as reaction within the contact and semiconductor elements is concerned. Both before and after hydration it is highly insoluble in water.

In an illustrative commercial practice, semiconductor units are sealed after initial assembly by soldering leads for the contact and semiconductor elements through metal envelope fittings. Despite precautions taken, there may be occasional splatter of the flux used in the soldering operation, which may contribute to failures.

The desiccant may act as a mechanical shield to prevent the flux from spattering the prepared semiconductor surface during formation of the solder seal.

Substantial advantages are realized, during testing of completed units by immersion in fluorescent dyes for detection of faulty or leaky seals, by using the powdered desiccant, since the powder becomes prominently colored by the dye in ordinary light if any dye should penetrate the seals. In accordance with this feature of the invention, the desiccant acts as an indicator. This at once eliminates the necessity for inspection of the units tested with the fluorescent dyes by using black light during manufacture and serves as a permanent prominent marker for units that were leaky when dye-tested.

The nature of the invention and further features, advantages and details will be best appreciated by reference to the following detailed disclosure, when taken in conjunction with the accompanying drawing, wherein:

Fig. 1 is an elevational and exploded view of a semiconductor diode partially processed in accordance with the teachings of the present invention; and, Fig. 2 is a sectional view illustrating the completed semiconductor diode.

Referring now specifically to Fig. 1 there is shown a purely illustrative crystal rectifier partially processed in accordance with the present invention. In typical standard practice as to this form of unit, a properly prepared chip 10 of germanium, preferably polished and etched on the surface 10*a* and copper-plated on the opposite surface, is soldered to a pin or support 12, suitably by means of a conventional tin-lead solder and with the aid of a zinc-chloride flux. Subsequent to subassembly of the germanium element or chip 10 and the lead 12, it may be advisable to etch and wash the subassembly to remove any spatter of corrosive flux incidental to securing the element 10 to the lead 12. The pin 12 is thereafter fixed to an envelope 14, seen to include axially aligned metal fittings or sleeves 16, 18 joined by glass-to-metal seals to a length of glass tubing or the like 20. The metallic sleeves 16, 18 are of an alloy that is suitable for bonding to the glass used.

A further subassembly is prepared which includes an appropriately contoured resilient wire contact element or whisker 22, as of tungsten, having a prepared point 22*a*, the contact element 22 being supported on an appropriate pin or lead 24. The lead or support 24 is receivable within the fitting 18 and upon axial adjustment brings the prepared point 22*a* of the whisker 22 into contact with the prepared surface 10*a* of the semiconductor body 10.

Prior to axial assembly of the pin 24 with the cartridge 14, a mobile mass 26 of a finely divided desiccant notably powdered activated aluminum oxide or calcium hydride, is inserted into the cartridge via the bore provided through sleeve 18. The desiccant, which is active in the sense that it is dehydrated and capable of absorbing moisture, is electrically insulating and highly insoluble in water both in its initial state and when hydrated. It is advantageously inserted in an amount sufficient to cover the prepared surface 10*a* of the semiconductor body 10, and at least partially fill the cavity or enclosure 14*a* provided by the cartridge or envelope 14. While shown as covering the crystal, certain of the important advantages of the invention are realized even when the desiccant does not cover the wafer 10. The presence of the aluminum oxide in finely powdered form assures capture of the water vapor remaining in the unit, such as on the walls of the enclosure 14*a* and on the prepared surface 10*a* of the semiconductor, and avoids the possibility of moisture reaching the exposed junction or contact to be formed between the whisker 22 and the semiconductor body 10.

After insertion of the desiccant in suitable amounts, the pin 24 is inserted through the fitting 18, and axially adjusted to bring the point 22*a* of the whisker element 22 into contact with the germanium element 10 after passing through the mass 26 of the desiccant. During this final assembly operation it may be desirable to vibrate the subassembly of the pin 12 and the cartridge 14 at high speed. This assures intimate contact of the aluminum oxide with the prepared germanium surface 10*a* and in theory this may promote moisture capture from that surface and the vibration further facilitates penetration of the whisker element 22 through the mass of the desiccant 26 that might otherwise be packed and obstruct the contact. High speed vibration of the semiconductor and glass assembly may be accomplished by appropriate magnetic, mechanical or piezo-electric vibrating devices in accordance with well understood practices. The final sealing operation which here includes soldering of the lead or pin 24 within the sleeve 18 may be accomplished along with concurrent electrical pulsing and testing of the unit that is thus completed. The fact that the unit is sealed is quite significant, for if the unit were open or exposed to air through mere mechanical joints, the desiccant would serve only to draw more and more moisture into the unit, with harmful effect, rather than to capture the initially present moisture.

The presence of the desiccant in no way restricts application of known manufacturing techniques. For example, since aluminum oxide does not react with the rectifier materials it is possible to pulse the whisker element 22 without adverse effect. Were pulsing attempted in the presence of active compounds, evolution of decomposition products might occur which might react with the materials at the contact area. Furthermore, aside from the attendant electrical and mechanical advantages of moisture absorption and shielding incident to the presence of the powder fill within the unit, the aluminum oxide facilitates testing of units for detecting faulty or leaky seals. A typical test frequently employed for the detection of poor seals is the "Zyglo" process which consists of immersing the presumably sealed units in a flourescent dye, desirably under pressure to cause dye penetration of seals that are leaky. Heretofore it has been necessary to inspect the dye-treated units under "black light," that is ultraviolet light, which would aid in detecting any dye within the unit. However, by employing the powdered desiccant, which turns a prominent color when any dye penetrates a leak in the unit, the leakers can readily be detected at any time thereafter and without "black light" apparatus.

A typical processing technique in accordance with the present invention is substantially as follows:

The assembly of the lead or pin 12 carrying the prepared semiconductor body 10 and the enclosure 14 is supported by an appropriate jig or fixture in an upright position wherein the bore of the sleeve 18 provides a guideway for the introduction therethrough of the powdered desiccant. Prior to the insertion of a predetermined quantity of the desiccant, it is desirable to bake the germanium body 10 for a prolonged period, on the theory that this tends to drive off as much of the surface moisture as possible. In this connection the baking should be prolonged until such time as the germanium is needed for assembly in a completed unit. Thereafter contacting of the germanium surface **10*a* by the prepared point 22*a* of the whisker 22 may be accomplished by axially adjusting the pin 24 which is receivable through the fitting 18**. Concurrent with this axial adjustment of the pin, it is desirable to vibrate the assembly if the amount of desiccant used actually covers the semiconductor. Further during the contacting and sealing operations, it is advantageous to maintain the entire assembly at an elevated temperature to further aid in driving off moisture. Subsequent to the final assembly or sealing operation, the units advantageously are heated to vaporize the entrapped moisture which is then captured by the desiccant. The value of the desiccant is greatly enhanced by baking the semiconductor and the desiccant within the envelope preferably after the unit is sealed. Typically, baking at a temperature in the range 70° C.–150° C. for a number of hours has been found eminently successful. This final step contributes most significantly to the successful use of the desiccant. Vibrating the unit during this baking step sufficiently to agitate the powder is also advantageous.

Various features of the invention are subject to substitution and modification. The illustrative unit is of the so-called point-contact rectifier type of semiconductor device employing germanium as the semiconductor. However the invention applies also to silicon and like rectifiers. It is especially valuable in improving the yield and stability of point-contact rectifiers, but can be applied to advantage in connection with so-called junction rectifiers of germanium and the like, and to transistors. Accordingly, the appended claims should be allowed such broad scope of interpretation as is consistent with the spirit and scope of the invention.

What is claimed is:

1. The process of preparing semiconductor devices comprising the steps of joining a semiconductor element having a prepared surface to a support, covering said surface with a quantity of a powdered desiccant, contacting said semiconductor element with a contact element extending through said desiccant while vibrating said elements, and hermetically sealing said desiccant and said elements within an envelope.

2. The process of preparing semiconductor devices comprising the steps of supporting a semiconductor element on a lead and within an envelope, inserting a quantity of a desiccant into said envelope sufficient to cover the prepared surface of said semiconductor element, adjusting a point contact element relative to said envelope for pressure engagement with said prepared surface while vibrating the assembly, and simultaneously fixing the assembly of said point contact and semiconductor elements and hermetically sealing said envelope by a flux-aided soldering operation.

3. The method of preparing stable semiconductor devices of the type including a rectifying contact and a semiconductor element mounted within an envelope, comprising the steps of enclosing a mobile mass of desiccant and the rectifying contact engaging the semiconductor element within the envelope, hermetically sealing said envelope against the atmosphere, and thereafter simultaneously baking and vibrating the sealed assembly.

4. The method of preparing semiconductor devices, including the steps of enclosing and hermetically sealing within an envelope a mobile quantity of anhydrous aluminum oxide together with a semiconductor unit embodying a rectifying junction, and baking the sealed device for a prolonged period at 70–150° centigrade.

References Cited in the file of this patent

UNITED STATES PATENTS

| | | |
|---|---|---|
| 756,676 | Midgley | Apr. 5, 1904 |
| 1,516,454 | Norton | Nov. 18, 1924 |
| 1,843,234 | Karnes | Feb. 2, 1932 |
| 2,460,109 | Southworth | Jan. 25, 1949 |
| 2,572,801 | Casellini | Oct. 23, 1951 |
| 2,686,279 | Barton | Aug. 10, 1954 |
| 2,820,931 | Koury | Jan. 21, 1958 |

FOREIGN PATENTS

| | | |
|---|---|---|
| 616,065 | Great Britain | Jan. 17, 1949 |
| 994,650 | France | Aug. 8, 1951 |